(12) United States Patent
Van Rompay

(10) Patent No.: US 9,581,127 B2
(45) Date of Patent: Feb. 28, 2017

(54) DEVICE FOR GENERATING HYDRO-ELECTRIC ENERGY

(71) Applicant: Boudewijn Gabriel Van Rompay, Clearwater, FL (US)

(72) Inventor: Boudewijn Gabriel Van Rompay, Clearwater, FL (US)

( * ) Notice: Subject to any disclaimer, the term of this patent is extended or adjusted under 35 U.S.C. 154(b) by 0 days.

(21) Appl. No.: 14/761,141

(22) PCT Filed: Jan. 16, 2014

(86) PCT No.: PCT/IB2014/000046
§ 371 (c)(1),
(2) Date: Jul. 15, 2015

(87) PCT Pub. No.: WO2014/111800
PCT Pub. Date: Jul. 24, 2014

(65) Prior Publication Data
US 2015/0354528 A1  Dec. 10, 2015

(30) Foreign Application Priority Data

Jan. 17, 2013  (BE) .................................. 2013/0034
Apr. 25, 2013  (BE) .................................. 2013/0291
Jul. 5, 2013  (BE) .................................. 2013/0471

(51) Int. Cl.
*F03B 17/06*  (2006.01)
*F03B 13/10*  (2006.01)
(Continued)

(52) U.S. Cl.
CPC ................ *F03B 13/10* (2013.01); *F03B 3/00* (2013.01); *F03B 11/02* (2013.01); *F03B 13/264* (2013.01); *F03B 17/063* (2013.01); *H02K 7/116* (2013.01); *F05B 2240/133* (2013.01); *F05B 2240/14* (2013.01); *F05B 2240/31* (2013.01); *F05B 2240/40* (2013.01); *F05B 2240/61* (2013.01);
(Continued)

(58) Field of Classification Search
CPC ........................................................ F03B 7/00
USPC ........................................................... 290/54
See application file for complete search history.

(56) References Cited

U.S. PATENT DOCUMENTS 1,761,818 A  10/1928  De Spuches
2,413,173 A * 12/1946  Cote ........................ B63H 5/02
440/91

(Continued)

FOREIGN PATENT DOCUMENTS

FR  2948422 A1  1/2011
FR  2989128 A1 * 10/2013  ............ F03B 17/063
(Continued)

*Primary Examiner* — Joseph Waks
(74) *Attorney, Agent, or Firm* — James Creighton Wray; Meera P. Narasimhan

(57) ABSTRACT

Device for generating energy using the current of a river (2) or similar, which device (1) includes a paddlewheel (11) and at least one generator set (14) of which the drive shaft (17*a*) is coupled to the shaft (11) of the paddlewheel (10), characterized in that the paddlewheel (10) is self-floating and that the device (1) is provided with an at least partly submerged housing (3) with an open bottom (4) that is located at a height (A) above the bed (5) of the river (2), wherein the paddlewheel (10) is bearing mounted and of which the internal space (8) is pressurized to regulate the height of the water level (12) in the housing (3).

26 Claims, 16 Drawing Sheets

(51) Int. Cl.
*F03B 3/00* (2006.01)
*H02K 7/116* (2006.01)
*F03B 11/02* (2006.01)
*F03B 13/26* (2006.01)

(52) U.S. Cl.
CPC ... *F05B 2240/931* (2013.01); *F05B 2240/932* (2013.01); *F05B 2240/97* (2013.01); *F05B 2270/18* (2013.01); *Y02E 10/28* (2013.01)

(56) References Cited

U.S. PATENT DOCUMENTS

| | | | | | |
|---|---|---|---|---|---|
| 3,993,913 | A * | 11/1976 | Dickman | .................. | E02B 9/08 290/53 |
| 4,717,831 | A * | 1/1988 | Kikuchi | ................ | F03B 13/184 290/53 |
| 5,136,174 | A * | 8/1992 | Simoni | ................. | F03B 17/062 290/43 |
| 7,223,137 | B1 * | 5/2007 | Sosnowski | .............. | B63B 35/44 290/54 |
| 7,928,594 | B2 * | 4/2011 | Shreider | ................ | F03B 11/08 290/43 |
| 8,310,078 | B2 * | 11/2012 | Shreider | ............... | F03B 17/065 290/42 |
| 8,690,477 | B2 * | 4/2014 | Dempster | ............. | F03B 17/063 290/54 |
| 8,957,541 | B1 * | 2/2015 | Jacobsen | ................ | F03B 13/00 290/54 |
| 2007/0020097 | A1 * | 1/2007 | Ursua | .................. | F03B 13/264 415/213.1 |
| 2010/0084870 | A1 * | 4/2010 | Burcik | .................... | F03B 17/06 290/54 |
| 2010/0237625 | A1 * | 9/2010 | Dempster | ................ | F03B 7/00 290/54 |
| 2012/0086207 | A1 * | 4/2012 | Gray | .................... | F03B 17/063 290/54 |
| 2012/0211988 | A1 * | 8/2012 | Harding | ................. | F03B 3/126 290/54 |

FOREIGN PATENT DOCUMENTS

| | | | | |
|---|---|---|---|---|
| GB | 2119449 | A | | 11/1983 |
| GB | 2445284 | A * | 7/2008 | ............ F03B 11/002 |
| WO | 2007053824 | A2 | | 5/2007 |

* cited by examiner

DEVICE FOR GENERATING HYDRO-ELECTRIC ENERGY

This application claims the benefit of Belgian Application No. 2013/0034 filed Jan. 17, 2013, Belgian Application No. 2013/0291 filed Apr. 25, 2013, Belgian Application No. 2013/0471 filed Jul. 5, 2013 and PCT/IB2014/000046 filed Jan. 16, 2014, International Publication No. WO 2014/111800 A2, which are hereby incorporated by reference in their entirety as if fully set forth herein.

The present invention relates to a device for generating hydroelectric energy.

More specifically, the invention is intended to generate hydroelectric energy using the current of a river, an estuary or similar.

Devices are known that use the current of the water to generate energy. A practical example of such a device is a hydropower station.

Such a hydropower station requires the creation of reservoirs by means of one or more dams.

The location of these reservoirs needs to be carefully chosen and not all rivers are suitable to allow them.

These reservoirs can have adverse effects on nature, since the natural habitat of animals and plants is disturbed.

These reservoirs involve a high loss of land area requiring the relocation of complete villages or cities and these artificial lakes can potentially be a risk upon failure of the dams.

Moreover, hydropower stations and dams are large and complex structures, so that the construction of such installations is an expensive, long and tedious matter.

Moreover, such a hydropower station forms an obstacle for water transport.

The turbines that are used are situated partly under water, which means that the turbines and the generators connected to the turbines need to be carefully sealed off, which complicates maintenance and repairs.

One also knows a type of underwater turbine, in which a screw, rotor or the like is placed under water which will start to rotate by the current of the water and which will generate electrical current in this way.

Also this type of installation has the disadvantage that the turbines and the generators connected to them needs to be sealed off carefully to prevent the adverse effects of exposure to the water.

This not only makes the installation expensive but also complicates the maintenance.

Moreover the rotating screw, rotor or the like forms a threat to marine life.

The present invention has as an objective to give a solution for one more of the above-mentioned disadvantages.

To this end the present invention provides a device for generating hydroelectric energy using the current of a river, estuary or similar, which device comprises a paddlewheel which can turn freely around an axis and at least one electrical generator set of which the drive shaft is transmitting torque by being coupled to the shaft of the paddlewheel, characterized in that the paddlewheel is self-floating and in that the device is provided with a complete or at least partially submerged housing in the shape of a bell with an open bottom that is situated at a height above the bed of the river, estuary or similar in which the paddlewheel is mounted with bearings on the housing and has paddles that extend at least partly below the open bottom of the bell of which the internal space is pressurized to adjust or preserve the water level in the bell such that the influence of the weight of the paddlewheel on the bearings is neutralized for the major part.

The paddlewheel can be bearing mounted with bearings on the housing by means of bearings that are placed in or against the housing and/or by bearings that are located in the generator set or sets itself.

An advantage is that the device is less susceptible to marine conditions, such as waves and extreme weather conditions.

Moreover, the generator set can be placed completely above the water level in the bell.

This has the advantage that this part of the device is not exposed to water such that their construction and in particular their sealing must not comply with strict requirements. Also the maintenance of the device shall be easier and cheaper.

Moreover, the majority of the rotating paddles is hidden under the bell, so there is little or no danger for marine life.

The device is also invisible, so there is no disturbance of the natural view of the river, estuary or similar.

Moreover, a device according to the invention is less bothersome for water transportation or can be placed at such a depth that ships can navigate over them and are thus not hindered.

Because of the self-floating capacity of the paddlewheel, it will be possible to make sure that the paddlewheel exerts less vertical force on its shaft or on the shaft of the generator set due to its weight.

This has the advantage that the energy transfer can be accomplished with substantially less losses.

Indeed, by regulating the water level in the housing such that the level of the shaft of the paddlewheel corresponds or almost corresponds to the level of the bearing when the paddlewheel floats freely on the water level, the weight of the paddlewheel will be compensated at least partially by the floating capacity of the paddlewheel thereby reducing the force that the paddlewheel exerts on its shaft or on the shaft of the generator.

In other words, it is ensured that when the paddlewheel is floating freely on the water level in the bell, or when the paddlewheel is in equilibrium with the water level in the bell, the level of the shaft of the paddlewheel corresponds or almost corresponds to the location of the bearing in or against the housing or the bearing in the generator set.

Preferably a speed regulation is provided for regulating the rotational speed of the paddlewheel and the generator sets coupled to the paddlewheel by adjusting the water level in the housing to control the depth of the paddlewheel in the water.

By adjusting the water level in the housing, the paddlewheel will experience more or less resistance from the water, whereby it will rotate faster or slower and whereby the speed of the paddlewheel and the generator sets can be adjusted.

By adjusting the water level, not all the weight of the paddlewheel will be compensated for by its floating capacity. Preferably, it is ensured that at least 80% of the force that the weight of the paddlewheel exerts is still compensated for by the floating capacity of the paddlewheel.

Due to this, the paddlewheel will hang in the bearings, but enough weight of the paddlewheel is still compensated for by the floating capacity of the paddlewheel so that the forces in the bearings are minimal and at the same time a speed regulation remains possible.

Following a preferred embodiment, the paddlewheel is provided with a number of paddles, at least one of which is always in the water during use.

These paddles can be affixed to a cylindrical section of the shaft, which is manufactured from a floating material.

Alternatively, the cylindrical part of the shaft can be hollow and filled with a gas or another floating material. This gas can be air.

Following a preferred embodiment, all parts of the device that come in contact with water are treated with a non-toxic coat of paint on the basis of a surface-treated composite coating, of the type of Ecospeed®.

Such a coating will ensure that the growth of slime, algae or similar on the above-mentioned parts can be easily removed.

Furthermore, such a coating provides a very good protection against corrosion, such that the metal parts can be made thinner because a possible degradation due to corrosion does not have to be taken into account.

The invention also relates to a series of devices according to the invention, whereby they are placed in a tidal river or estuary at a distance of one another viewed in the direction of flow of the tidal river or estuary and are spread over a distance of the tidal river or the estuary such that at least one device is always in a zone with flow.

With the intention of better showing the characteristics of the invention, hereafter, as an example without any limitative character, some preferred embodiments are described of a device for generating hydroelectric energy using the current of a river, estuary of similar according to the invention, with reference to the accompanying drawings, wherein:

DETAILED DESCRIPTION OF THE DRAWINGS

Figure 1:
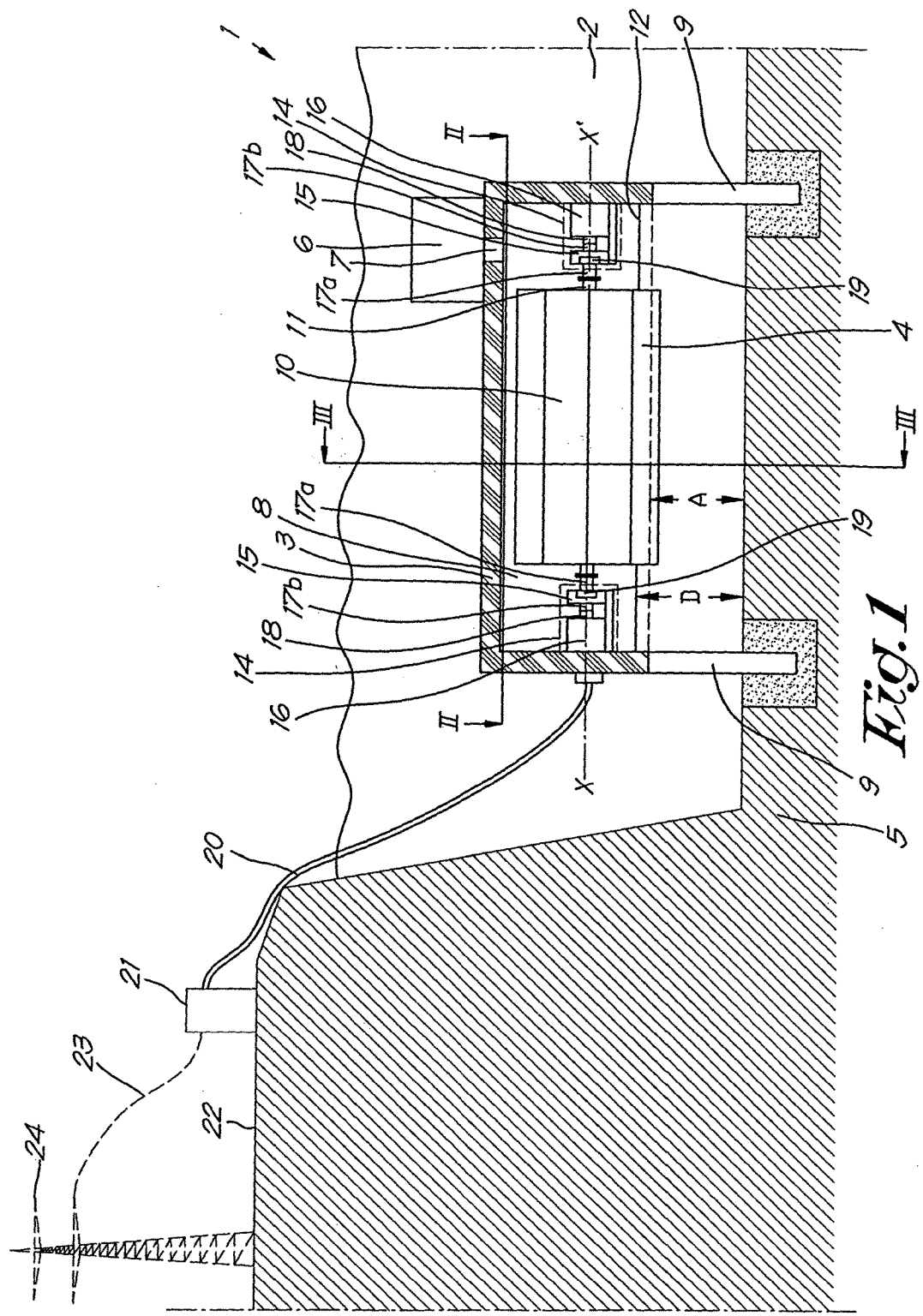
FIG. 1 schematically represents a preferred embodiment of a device according to the invention for generating hydroelectric energy, whereby the device is placed in a tidal river.
Figure 2:
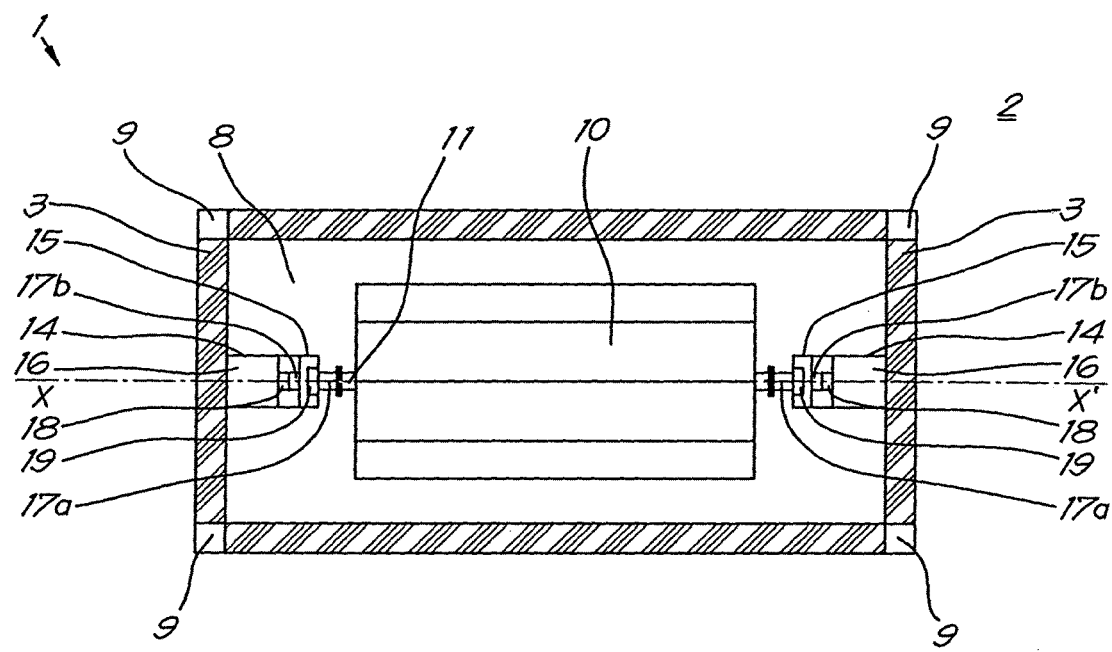
FIG. 2 schematically represents a cross section according to the line II-II' in FIG. 1.
Figure 3:
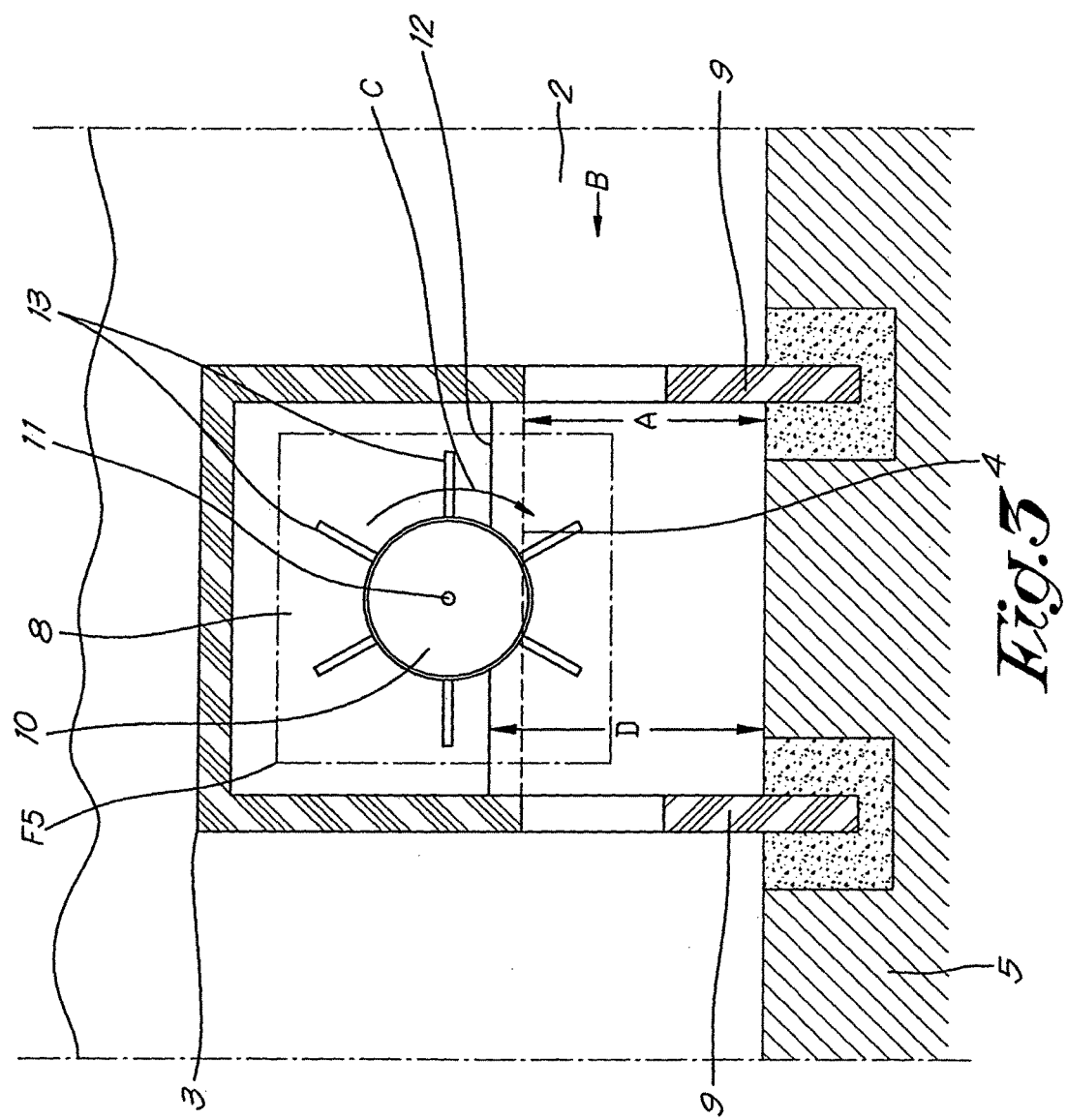
FIG. 3 schematically represents a cross section according to the line III-III' in FIG. 1.

In FIGS. 1, 2 and 3 a device 1 according to the invention which is placed in a tidal river 2 is shown.

The device 1 consists of a submerged housing 3 in the shape of a bell 3 with an open bottom 4.

The open bottom 4 is located at a distance A above the bed 5 of the tidal river 2.

The housing 3 is provided with means to pressurize the internal space 8 of the housing 3, in this case the means comprise a compressed air system 6, of which the outlet is connected to the internal space 8.

The internal space 8 is partly filled with compressed air and partly filled with water.

Four posts 9 which are connected to the housing 3 and are anchored to the bed 5 of the tidal river 2 maintain the device 1 in place and with its open bottom 4 at the appropriate height A above the bed 5 of the tidal river 2.

It is clear that also more or also less than four posts 9 can be provided.

A paddlewheel 3 is situated in the housing 3. The shaft 11 of the paddlewheel 10 is constructed from a floating material, the paddlewheel 10 therefore floats on the water. The shaft 11 of the paddlewheel 10 can turn freely around a geometric axis X-X'. In this case the paddlewheel 10 can rotate freely in two direction around the axis X-X'.

The shaft 11 of the paddlewheel 10 is equipped with a number of radially oriented flat paddles 13 that extend in the lengthwise direction parallel to the shaft 11 of the paddlewheel.

The paddlewheel 10 is designed such that the floating capacity of the paddlewheel 10 is sufficient to keep the shaft 11 of the paddlewheel 10 above the water level 12 in the bell 3 and to ensure that at least one of the aforementioned paddles 13 is always at least partially in the water. The paddles 13 extend at least partly below the open bottom 4.

The design, the floating capacity, the paddles 13 and the used material of the paddlewheel 10 are adapted to the expected local conditions of the place where the device 1 will be used.

Further, the device 1 is equipped with two generator sets 14, such that one is placed on each side of the paddlewheel 10.

Each generator set 14 comprises a transmission 15 and a generator 16 coupled to is. The transmission 15 is equipped with an incoming drive shaft 17a that is coupled to the shaft 11 of the paddlewheel 10 en with an outgoing drive shaft 17b that is coupled to the shaft 18 of the generator 16.

In this example, the paddlewheel 10 is bearing mounted in the housing 3 by means of a bearing that is situated in the transmission 15, via the incoming drive shaft 17a.

The generator sets 14 are preferably mounted in the internal space 8 of the bell 3, such that the weight of the generator sets 14 is supported by the bell 3. The floating capacity of the paddlewheel 10 and the location of the generator sets 14 are such that when the paddlewheel 10 floats freely on the water level 12 in the housing 3, the height of the shaft 11 of the paddlewheel 10 corresponds to the height of the drive shaft 17a of the generator sets 14, or with the bearing in the transmission 15.

In this case the drive shaft 17a of one of the two generator sets 14 turns in a first direction of rotation with the shaft 11 of the paddlewheel 10 en turns freely in the second direction of rotation, while the drive shaft 17a of the second generator set 14 turns freely in the first direction of rotation and turns in the second direction of rotation with the shaft 11 of the paddlewheel 10.

To this end, the generator set 14 comprises a freewheel 19 that enables a free rotation of the drive shaft 17a of the generator set 14 with respect to the shaft 11 of the paddlewheel 10 in one direction and forms a fixed turning coupling in the other direction of rotation.

De generator set 14 is in this case a direct current generator set 14 that is connected to an inverter 21 by means of an electric cable 20 on the bank 22 that will convert the direct current supplied into an alternating current, which can be supplied to the electricity grid 24 via a cable 23.

It is not excluded that the inverter 21 is situated in the housing 3 instead of on the bank 22.

In this case, all the parts of the device 1 that make contact with water are provided with a non-toxic coat of paint on the basis of a surface-treated composite coating.

Due to the nature of the coating the growth of for example algae, slime and barnacles can easily be removed.

Moreover, the treated parts will not be adversely affected by corrosion because such a coating exhibits excellent corrosion-resistant properties.

The operation of the device 1 according to the inventions is very simple and as follows.

When the device 1 placed in a tidal river 2 as shown in FIGS. 1, 2 and 3, the current of the water will make the paddlewheel 10 turn.

It is known that during certain periods tidal rivers 2 flow out to the sea and during other periods flow in the reverse direction away from the sea. This means that the paddlewheel 10 will be driven in one direction of rotation around the axis X-X' during certain periods and in the reverse direction during other periods.

In the case of FIGS. 1, 2 and 2 the water flows in the direction of the arrow B such that the paddlewheel 10 is driven in the direction of arrow C. In this case due to the action of the freewheel 19 the left generator set 14 of FIGS. 1 and 2 is driven by the paddlewheel 2, while the generator set 14 of FIGS. 1 and 2 will not be driven. In this case, the left generator set 14 will generate electrical power, which after conversion in the inverter 21 is supplied to the electricity grid 19.

The transmission 15 is designed such that the speed of the paddlewheel 10 is transmitted to the generator 16 with a certain transmission ratio in order to drive the generator at a suitable and preferable constant speed for the generation of electric power.

When the tide reverses, the direction of flow will reverse in a direction opposite to that of arrow B, such that the paddlewheel 10 will also be driven in the opposite direction of rotation of the arrow C. In this case the right generator set 4 will be driven by the paddlewheel 2 and the left generator set 14 can turn freely with respect to the paddlewheel 10 due to the action of the freewheel 19 and is thus not driven. In this case the electric power will be generated by the right generator set 14 while the left generator set 14 will not generate any electric power.

It is thus clear that, whatever the direction B of the flow 21 may be, electric power will always be supplied by one of the two generator sets 14, such that electricity is delivered to the electricity grid 24 continuously.

To adjust the water level 12 in the bell 3, use is made of a compressed air installation 6 which allows to bring highly or less compressed air into the bell 2. Due to this the height D of the water level 12 in the bell 3 can be adjusted, such that de generator sets 14 and other parts of the device 1 do not come below the water level 12 and such that the height of the shaft 11 of the paddlewheel 10 corresponds to the drive shaft 17a when the paddlewheel 10 floats freely on the water level 12 in the clock 3.

Moreover, it will be ensured that the height D of the water level 12 is always larger than the height A of the open bottom 4 of the bell 3.

Figure 4:
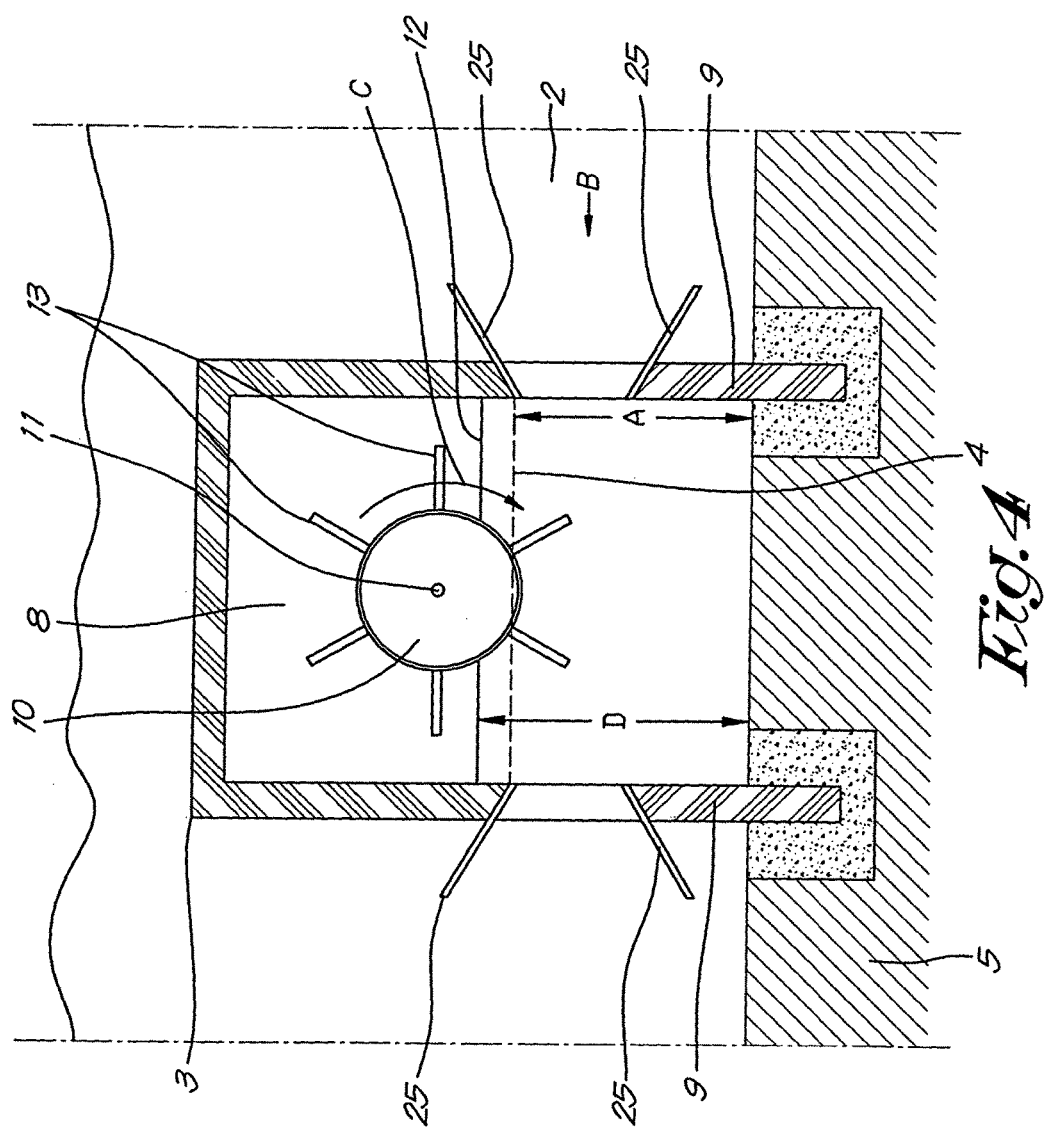
FIG. 4 schematically represents an alternative embodiment of FIG. 3.

The alternative embodiment shown in FIG. 4 differs from the previous embodiment in that there are two funnels 25 provided at the open bottom 4, to locally increase the current.

If desired, only one funnel 25 can be provided, for example when the river is not a tidal river 2.

The operation of this device 1 is analogous to the device from FIGS. 1, 2 and 3, whereby the water will flow under the housing 3 and will be guided via the funnels 25 to the paddlewheel 10 and drive the paddlewheel 10.

It is clear that the funnels 25 can also be integrated in or to the housing 3 of the posts 9.

Figure 5:
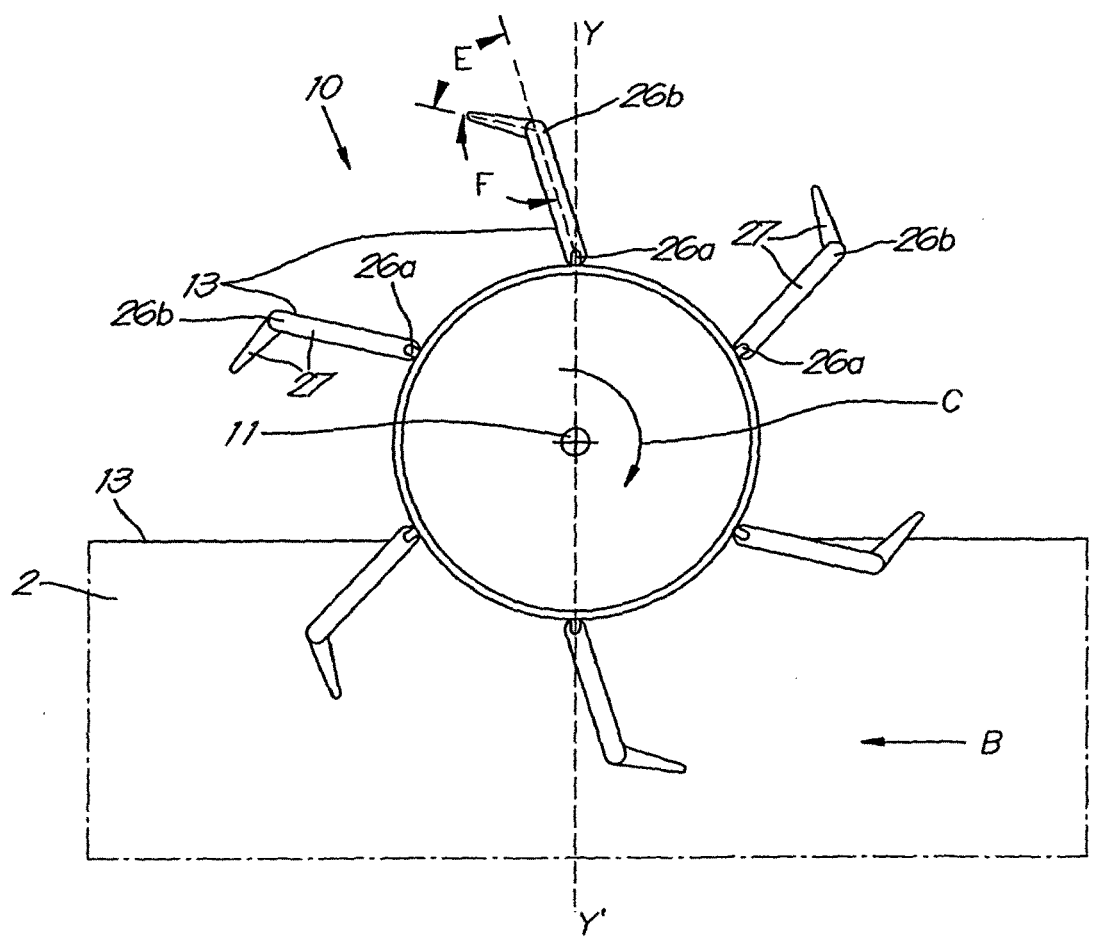
FIG. 5 schematically represents an alternative embodiment of the part F5 in FIG. 3.

FIG. 5 shows an alternative embodiment of the paddlewheel 10 of FIG. 3, whereby in this case the paddles 13 are not flat but are rotatable at their basis by means of a hinge mechanism 26a which connects the paddles 13 to the shaft 11 of the paddlewheel 10. Furthermore, there is an adjustment mechanism which is not represented in the figure and which allow to block the rotational angle E of the paddles 13 with respect to the radial direction Y-Y' in a certain inclined position.

The hinge mechanism 26a allows a rotation along a geometric axis X-X' that extends parallel to the shaft 11 of the paddlewheel 10.

Additionally, but not necessarily, the paddles 13 in this alternative embodiment of FIG. 5 are segmented with, in this case, two segments 27 that are rotatable with respect to one another around a geometric axis X-X' parallel to the shaft 11 of the paddlewheel 10 by means of a hinge mechanism 26b. An adjustment mechanism, not shown in the figure, is provided to block the angle F between the segments 7 in a specified position.

In this way the position of the paddles 13 and the geometry of the paddles 13 can be adjusted to the given conditions of the local current to be able to optimize the efficiency of the device 1. It is clear that more than two segments 27 are possible.

Figure 6:
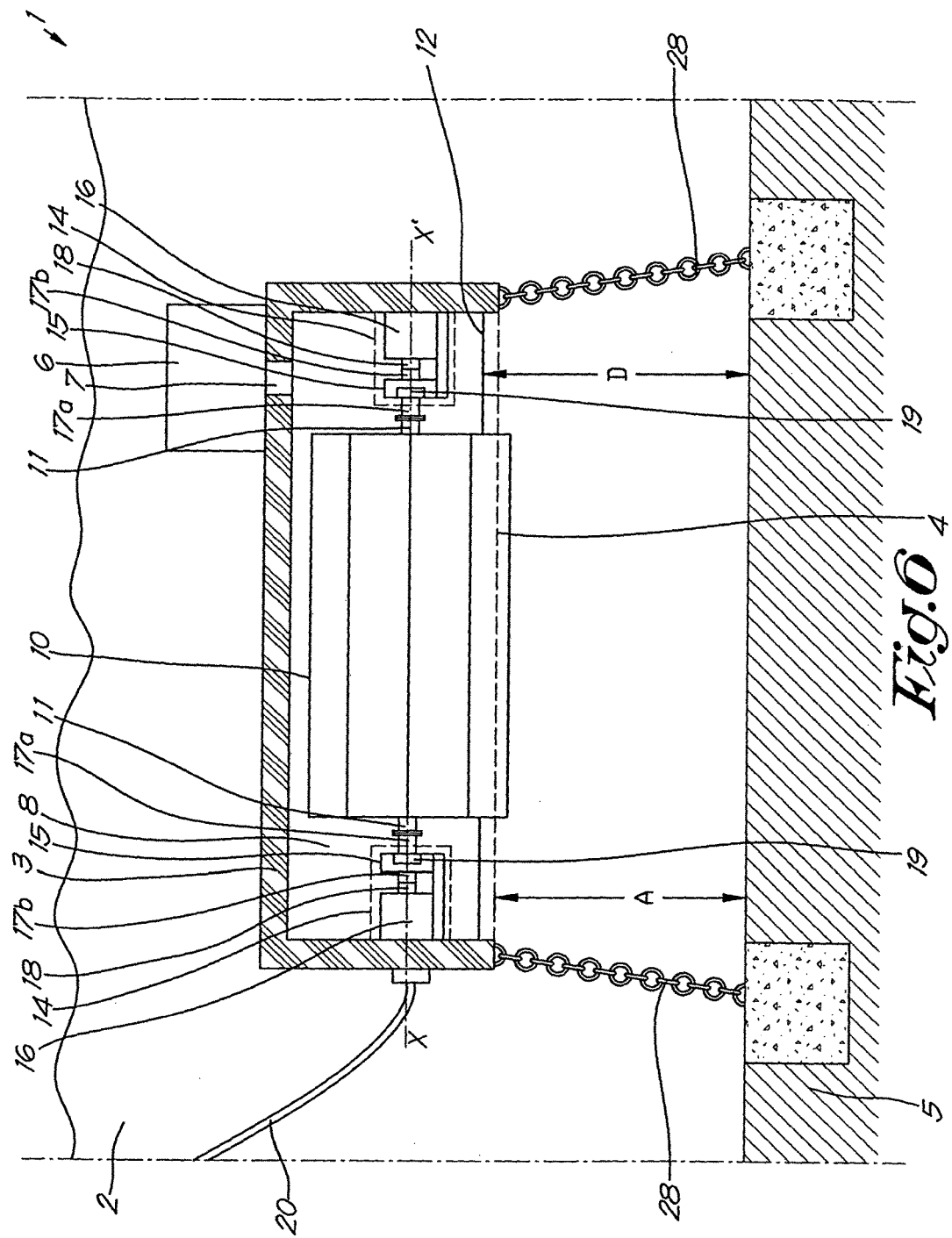
FIG. 6 schematically represents an alternative embodiment of the device according to the invention.

The alternative embodiment shown in FIG. 6 differs from the previous embodiment from FIGS. 1 to 3 in that it is equipped with two anchor chains 28 instead of four posts 9. These are connected to the housing 3 and are anchored to the bed 5 of the tidal river 2. They keep the device 1 in place and with the open bottom 4 on the appropriate height above the bed 5 of the tidal river 2.

The operation is analogous to the operation of the previously described embodiment.

Figure 7:
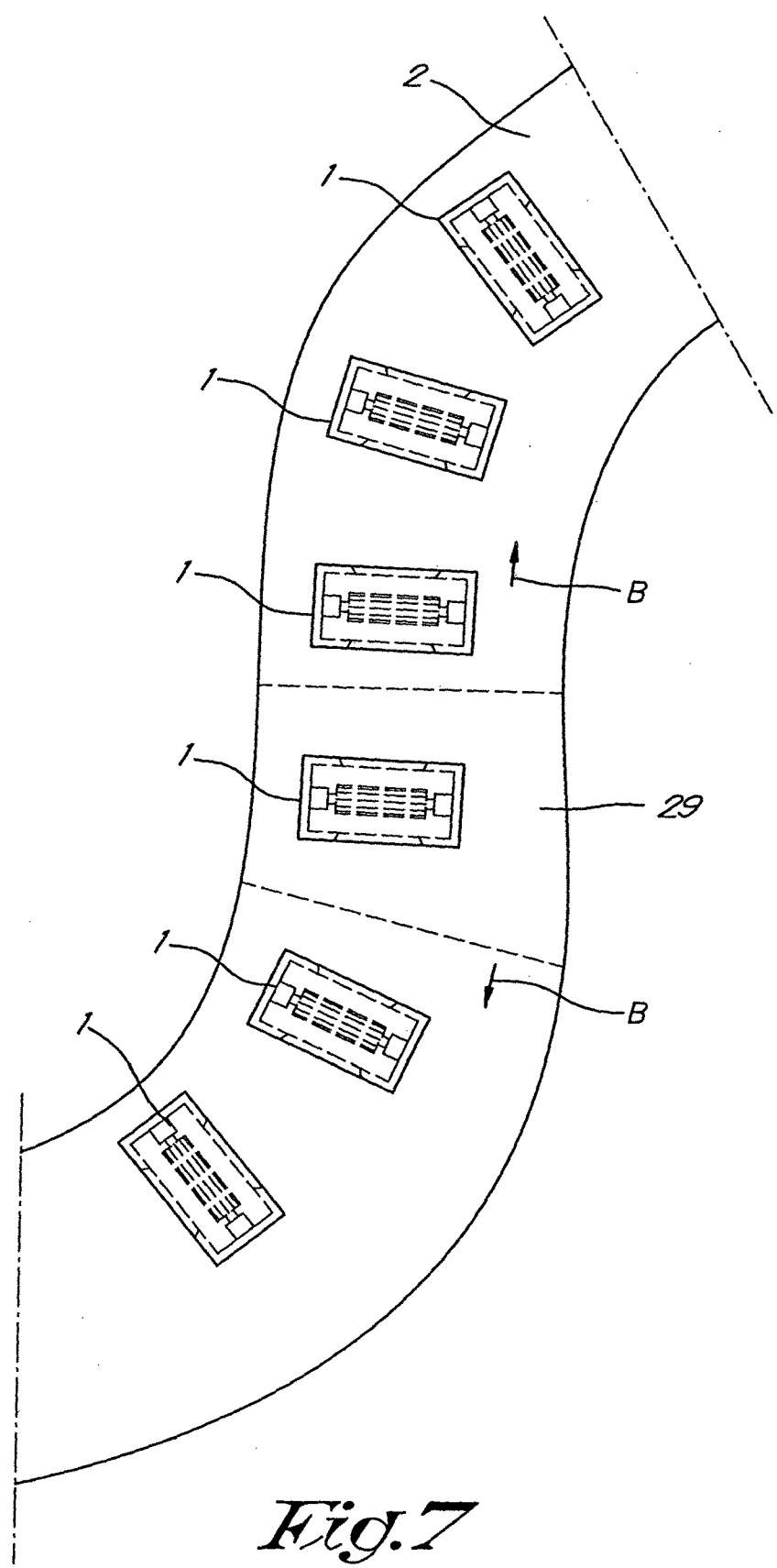
FIG. 7 represents a top view of a river in which a series of devices according to FIG. 1 is placed.

Preferably, a series of the afore mentioned devices 1 according to the invention is spread over a distance of the tidal river (2), as shown in FIG. 7.

Upon the turn of the tide there will always be a zone 29, as shown in FIG. 7, in which the flow stops so that the device 1 that is in this zone is temporarily out of use, for a period of around twenty minutes for example.

However, it is known that this zone 29 is localized and moves along the river 2, so that in the case of FIG. 7 there will always be devices 1 that are outside the zone 29 of stationary water and are consequently driven by the current, at least if the distance between the devices 1 is chosen sufficiently large.

In this way a continuous supply of electric power is assured as a few devices 1 are always in service and only a limited number are temporarily out of service when located in the zone 29.

Figure 8:
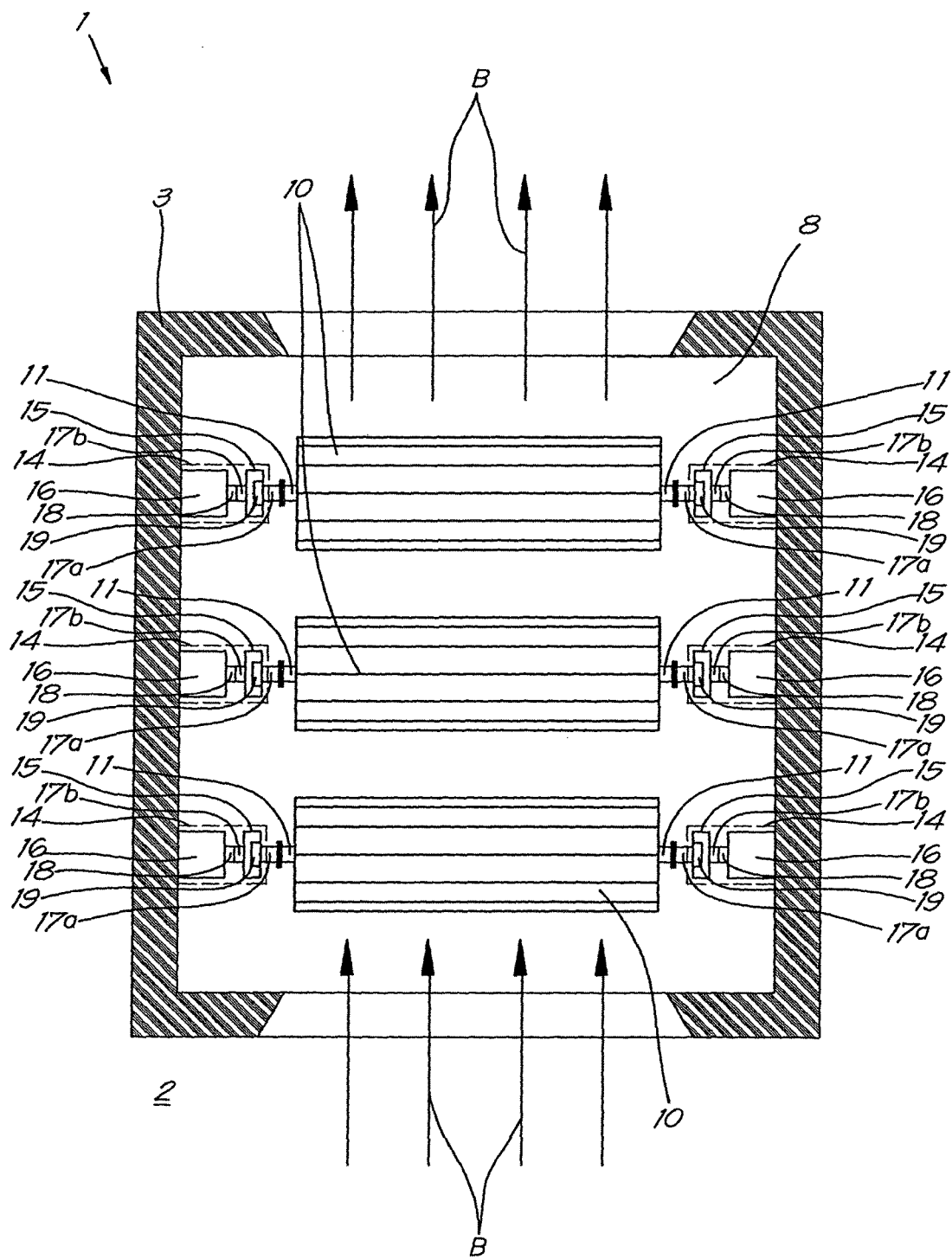
FIG. 8 schematically represents another alternative embodiment of a device according to the invention.

The embodiment as shown in FIG. 8 is equipped with several paddlewheels 10 in the housing 3, in this case three. Each paddlewheel 10 is provided with two generator sets 14, one on each side of the respective paddlewheel 10.

The different paddlewheels 10 are positioned with their shafts 3 parallel to one another and behind one another with respect to the direction of flow.

Each paddlewheel will be driven by the current of the water of the tidal river 2, similar to the first embodiment. For each device 1, more generator sets 14 will generate electric power at the same time, which will increase the total power per device 1.

It is clear that for this embodiment, more devices 1 can be placed one behind the other in a tidal river 1.

It is also clear that there can be only two or more than three paddlewheels 10 placed inside the housing 3.

Figure 9:
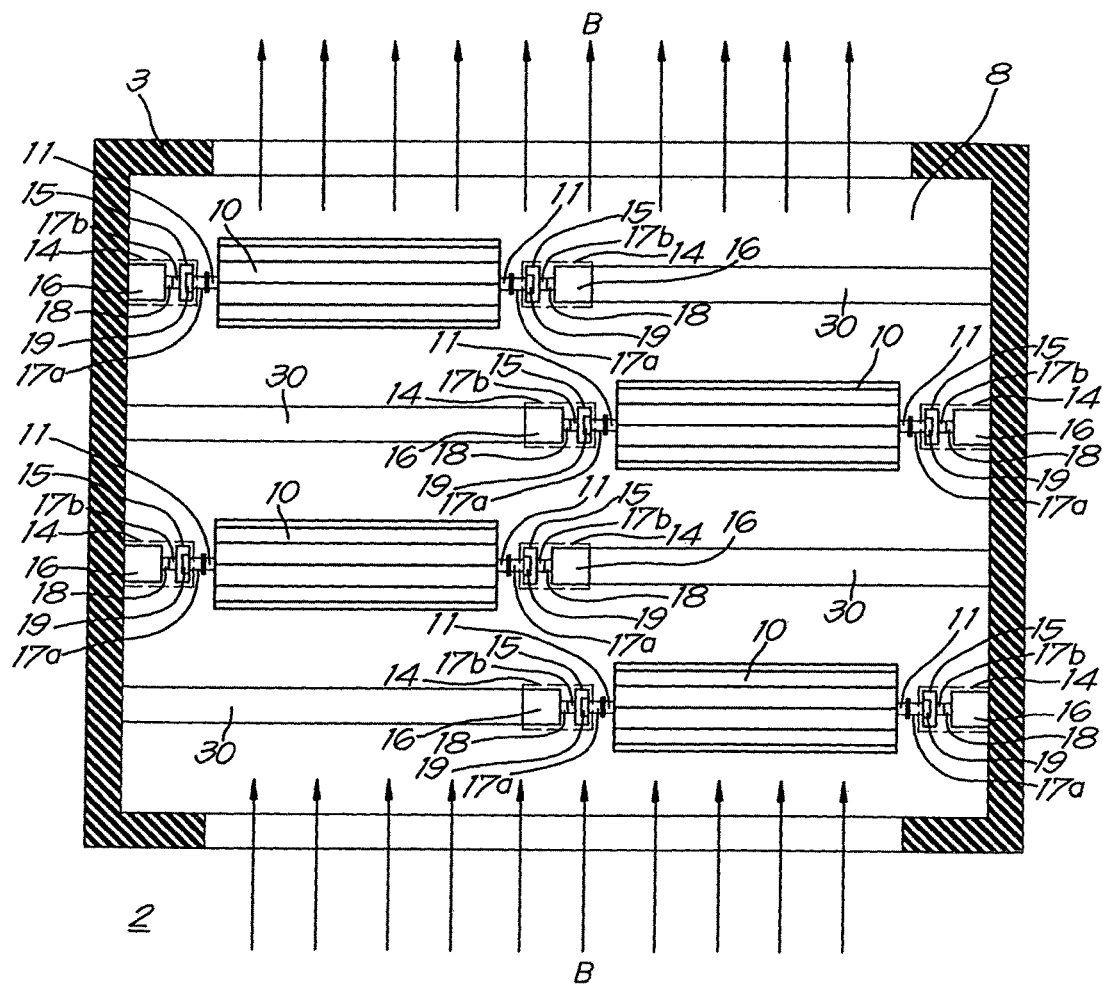
FIG. 9 schematically represents an alternative embodiment of FIG. 8.

If desired, a number of paddlewheels 10, in this case four, can be placed staggered one after the other, as shown in FIG. 9.

Alternately the left or the right generator set 14 is hereby placed on a platform 30 situated inside the housing 3 in stead of placing this generator set 14 on the housing 3 itself.

By using the platforms 30, the paddlewheels 13 will be behind each other in a staggered manner instead of being behind each other in a straight line.

The operation is similar to the operation of the device 1 of FIG. 8.

It is of course not excluded that more than or less than four paddlewheels 10 are placed in a staggered manner in the housing 3.

In the embodiments with more paddlewheels 10, it can be an option to let at least one paddlewheel 10 only be driven by the current of the river 2 in a first direction of flow en to have at least one other paddlewheel 10 only be driven by the current of the river 2 in the second, opposite direction of flow.

For example, it can be elected to let one half of the paddlewheels 10 rotate in the first direction of flow and to let the other half of the paddlewheels 10 rotate in the opposite direction of flow.

This will ensure that the freewheel 19 is redundant, since the drive shaft 17*a* of the generator sets 14 will be driven in only one direction by the shaft 11 of the paddlewheel 10.

Figure 10:
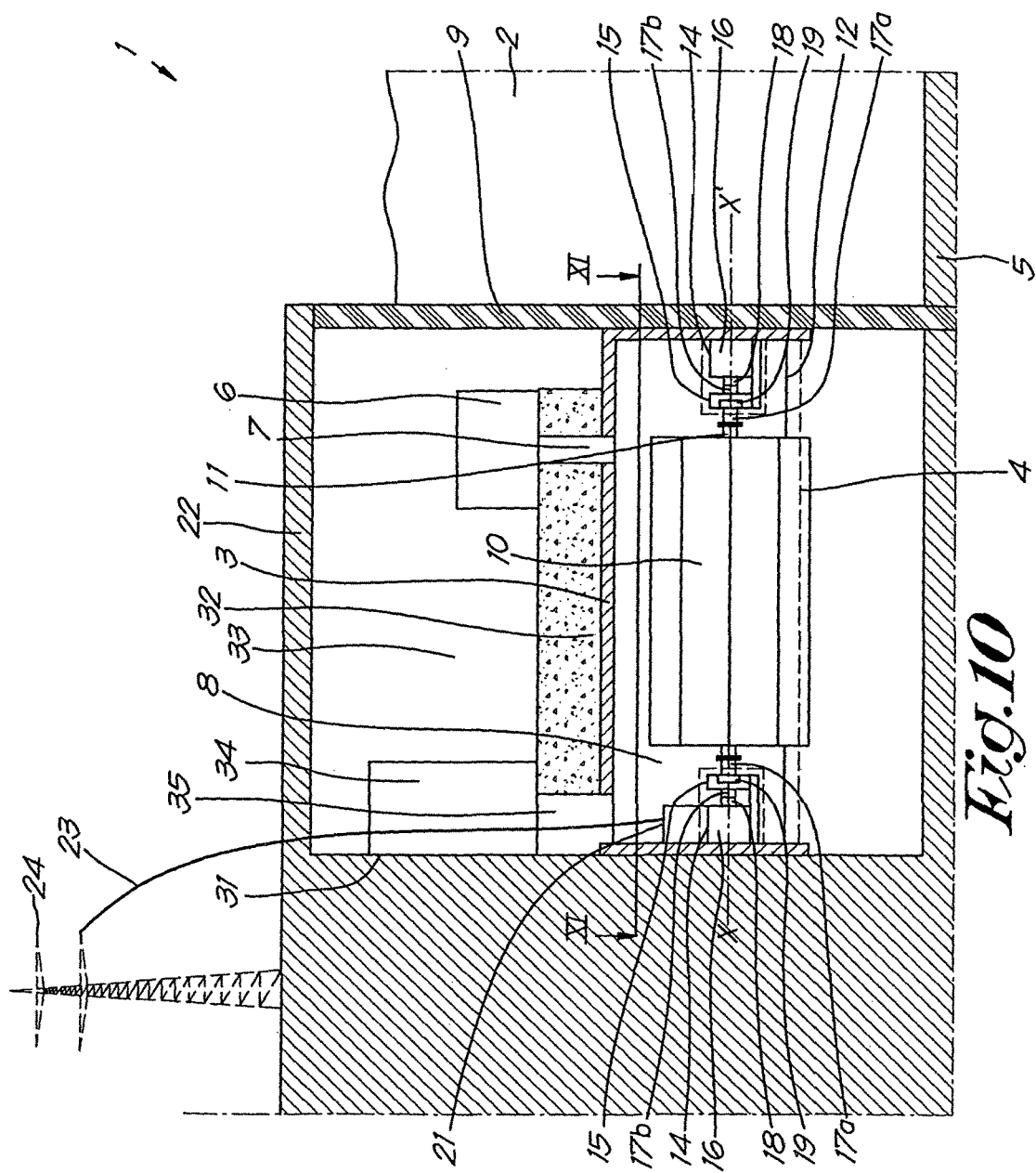
FIG. 10 schematically represents yet another embodiment of the device according to the invention.
Figure 11:
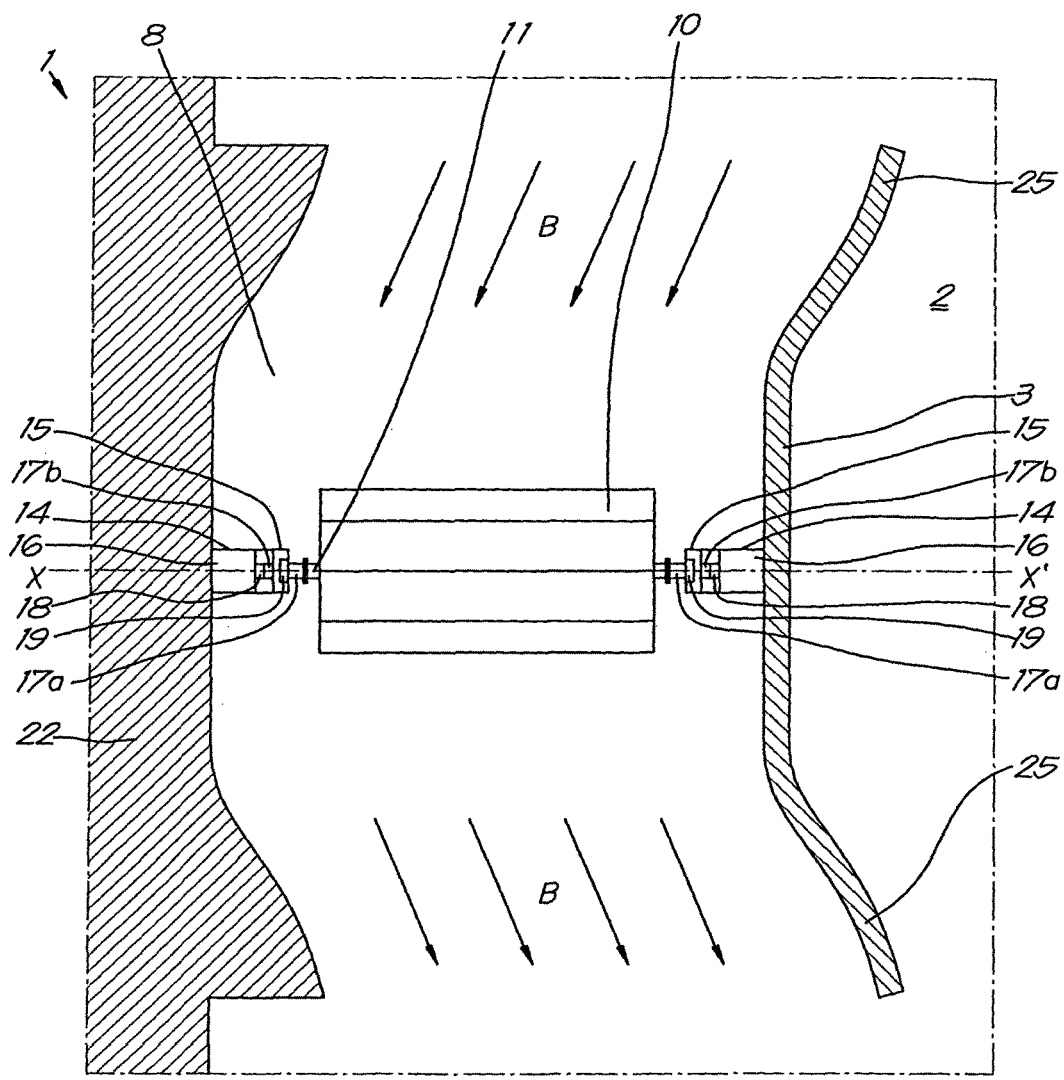
FIG. 11 schematically represents a cross section according to the line X-I-XI'.

In FIGS. 10 and 11 an alternative embodiment is represented of the device 1 according to the invention, whereby the housing 3 is integrated in the bank 22, more specific in the quay wall 31.

In this case the posts 9 are partly integrated in the bank 22, whereby these posts 9 are anchored in the bed 5 of the river 2 to keep the housing 3 in its place against the quay wall 31.

On the housing 3 a large block 32 is provided, made of concrete for example.

This block of concrete 32 will provide the necessary counterweight to make sure the housing 3 stays under water against the upward force of the water.

On this block of concrete 32 the compressed air installation 6 is provided in this case, which pressurizes the internal space 8.

Above the block 32, under the bank 22, there is a space 33 in which an access lock 34 is provided which provides access to the internal space 8 in which the paddlewheels 10 with the generator sets 14 are located.

Via this access lock 34 and the passage 35 persons, which are responsible for the maintenance and/or repairs of the device 1, can easily access the internal space 8.

In this case the inverter 21 can also be provided in the housing 3, instead of on the bank 22.

The device 1 is also provided with funnels 25, which are executed asymmetrically in this case, since the presence of the quay wall 31 does not allow a symmetrical execution, and which will ensure a guidance of the current of the water via the paddles 13 of the paddlewheel 10.

The operation of the device 1 is analogous to the first described embodiment.

It is clear that between the access lock 34 and the housing 3 a passage tube 35 is provided to bridge the distance between the space 8 and an entrance above the water level.

Also in the other above mentioned embodiments, an access lock 34 and a vertical access tube 35 can be used to be able to reach the internal space 8.

It is further also possible that the other above mentioned embodiments are provided with a block of concrete 32, placed on top of the housing 3 for example, to make sure the device 1 stays under water.

It is also clear that in the other embodiments the inverter 21 can be placed in the housing 3.

Figure 12:
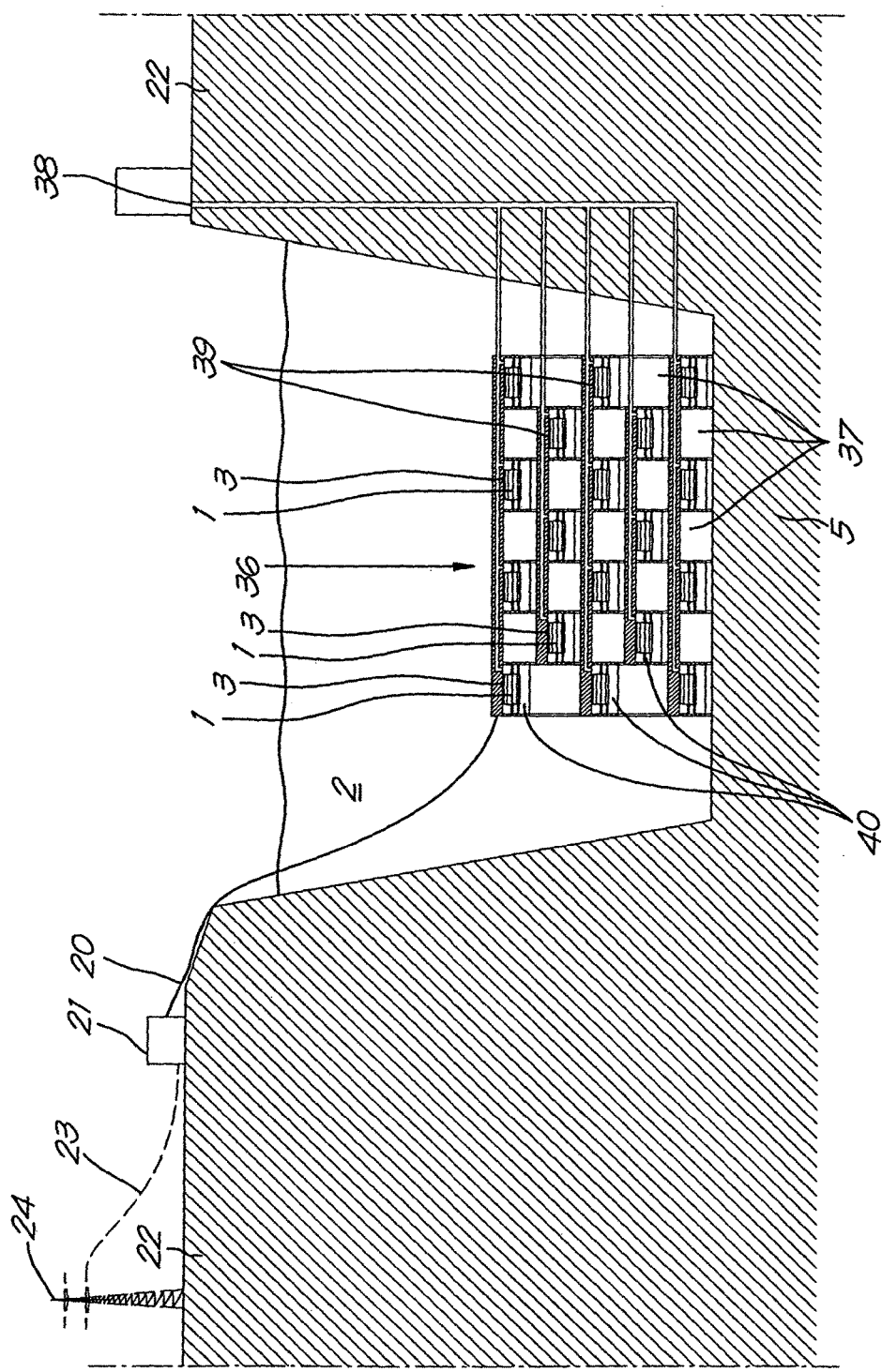
FIG. 12 represents a cross section of a river in which a series of devices according to FIG. 1 is placed to form a wall of devices.

In FIG. 12 is shown how a series of devices 1 as represented in FIG. 1 are being placed next to each other and on top of one another in a tidal river 2 to form a wall 36.

The wall extends perpendicular to the flow direction B of the tidal river 2.

In this case the devices 1 are placed in a staggered manner, whereby a free space 37 is provided both above and under as well as left and right of each device 1 to allow the current to pass through. For this purpose, the housings 3 are interconnected in a suitable manner.

Furthermore, the wall 36 can extend over the entire width of the river 2, as well as over only a part of the width.

A service access 38 is provided in the bank 22 which is connected with several service corridors 39 which are situated between the rows of devices 1 of the wall 36.

This service access 38 and service corridors 39 allow to easily perform maintenance and repairs since the devices 1 are easily accessible.

The service corridors are provided with an access lock that allow an access to the spaces 8 such that the spaces 8 are constantly separated from the outside air.

The operation of the devices 1 is analogous to the previously described operation.

The generated energy of all the devices 1 will be transmitted jointly in this case via one cable 20 to the inverter 21 on the bank 22. This can be realized by connecting the generator sets 14 in the appropriate way.

If desired, the devices 1 can be provided with a funnel 25 or the inverter 21 can be provided in the wall and/or a block of concrete can be provided on the wall 36 to make sure that the wall 36 of devices 1 stay under water.

It is clear that several of these walls 36 can be placed in a tidal river 2 one after another and on a suitable distance from each other.

Figure 13:
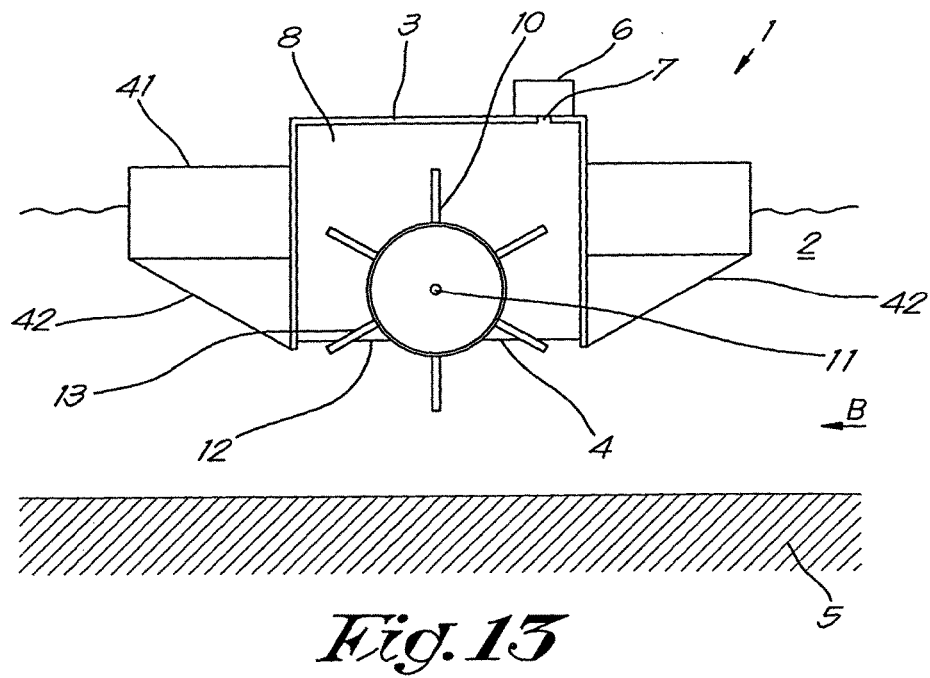
FIG. 13 schematically represents yet another alternative embodiment of a device according to the invention.
Figure 14:
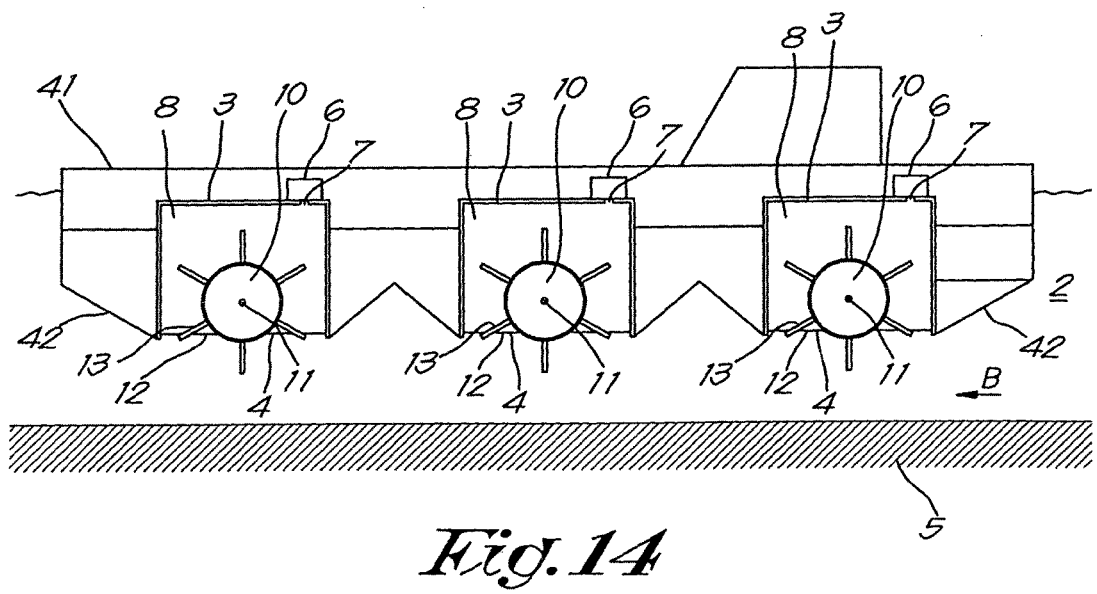
FIG. 14 schematically represents a variant of the embodiment of FIG. 13.

In FIG. 13 yet another alternative embodiment is shown, whereby FIG. 14 shows a variant.

In FIG. 13, the device 1 is placed or built-in in a floating or buoyant structure 41 which floats on the water surface of the river 2. In this case the housing 3 is only partly submerged.

This structure 41 can be an old, discarded ship, a pontoon or similar and will ensure that the open bottom 4 of the housing 3 is kept at a distance from the bed 5 of the river 2.

This structure can also be a new ship or pontoon, which can be built to be light and cheap.

There are flow enhancers 42 provided on the bottom side of the floating structure 41. These will realize a local acceleration of the water at the location of the paddles 13.

The flow enhancers 42 are in this case realized as plates that form a narrowing with the bed 5 of the river 2 that first narrows and then widens in the direction of the flow B.

Preferably the device 1 is equipped with a compressed air installation 6 that pressurizes the space 8 of the device 1 slightly whereby the pressure can be adjusted such that the water level 12 in the housing 3 corresponds approximately with the open bottom 4 of the housing 3.

Furthermore, the paddlewheel 10 is a floating paddlewheel 10 which extends with its paddles 13 under housing 3 to catch the current and to convert it to mechanical or electrical energy.

The operation is analogous to the afore-mentioned embodiments.

Such an embodiment allows to recuperate old ships, moreover the construction can be realized in a very light and cheap way.

Moreover, when an old or new ship is being used as a floating structure 41, it will be possible to incorporate several devices 1 in the ship and to generate more energy. This is represented in FIG. 14 which shows the most preferred embodiment of the invention and which comprises a series of devices 1 placed behind one another in the current, whereby each device 1 comprises a floating paddlewheel 10 that is provided in a space that is open at the bottom and that is pressurized to regulate the water level 12 and that are provided with flow enhancers 42 to be able to subject the paddles 13 to a maximum flow current.

In the embodiment of FIGS. 13 and 14 it is not excluded that the floating capacity of the floating or buoyant structure 41 can be adjusted or varied.

When a ship is used, the floating capacity of the ship can be adjusted by means of its ballast tanks. By filling these with more or with less water, the draught of the ship can be adjusted.

This has the advantage that deeper currents of the river 2 can be used, where the current can possibly be stronger. Moreover, the draught of the ship can be made smaller, such that the ship can be placed in a dock for maintenance and/or repairs.

Figure 15:
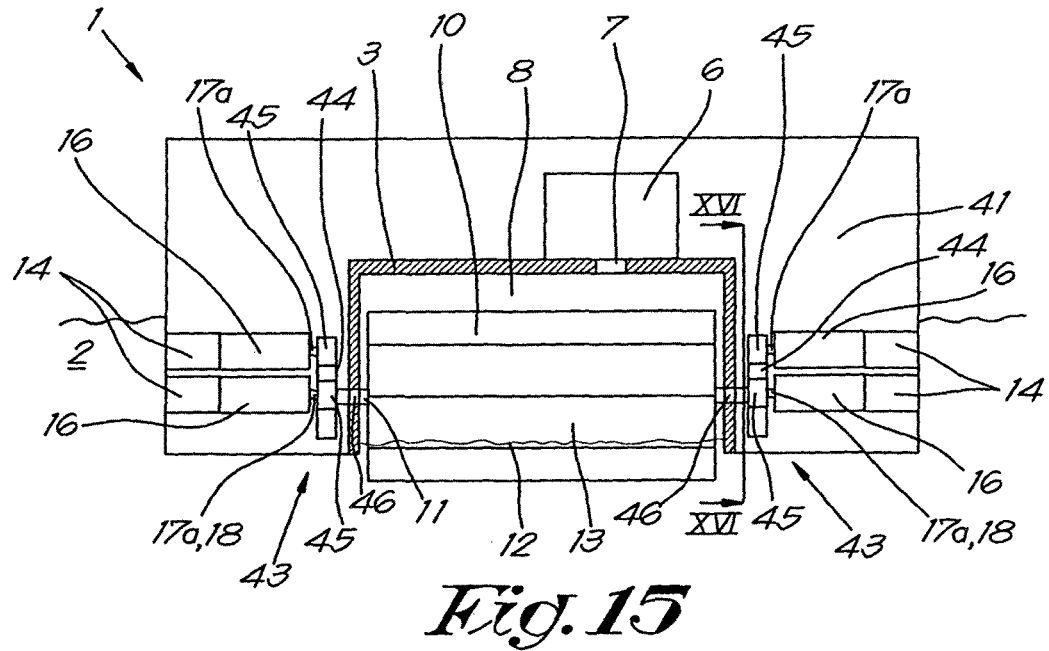
FIG. 15 schematically represents another alternative embodiment of the device according to the invention.

In FIG. 15 yet another alternative embodiment is shown, similar to the embodiment of FIG. 13, whereby in this case the shaft 11 of the paddlewheel 10 reaches through the housing 3 and whereby the drive shaft 17a of the electrical generator set 14 is coupled to the shaft 11 of the paddlewheel 10 by means of a gear transmission 43 with a gearwheel 44 on the shaft of the paddlewheel 10 and with a cooperating gearwheel 45 on the drive shaft 17a of the generator sets.

Both the gearwheel 44 and the generator sets 14 are located outside the internal space 8 of the housing 3, in this case in the floating structure 41.

The paddlewheel is mounted in bearings 46 that are situated in the housing 3.

The gearwheel 45 on the drive shaft 17a cooperates with the gearwheel 44 to transmit the movement of the shaft 11 of the paddlewheel 10 to the generator set 14.

The generator set 14 is equipped with a generator 16, of which the incoming drive shaft 17a serves as the shaft 18 of the generator 16.

The transmission 15 is in this case formed by the gear transmission 43 whereby, by selecting the diameter of the gearwheel 44 to be at least ten times larger than the diameter of the gearwheel 45, the speed of the paddlewheel can be transferred to the generator set 14 with a suitable transmission ratio to drive the generator 16 with an appropriate speed. Preferably the diameter of the gearwheel 44 is a big number of times larger than the diameter of the gearwheel 45 of the generator sets 14.

In this case the diameters of the gearwheels 44, 45 are chosen such that the diameter of the gearwheel 44 of the paddlewheel 10 is ten times larger than the diameter of the gearwheel 45 of the generator sets 14.

Figure 16:
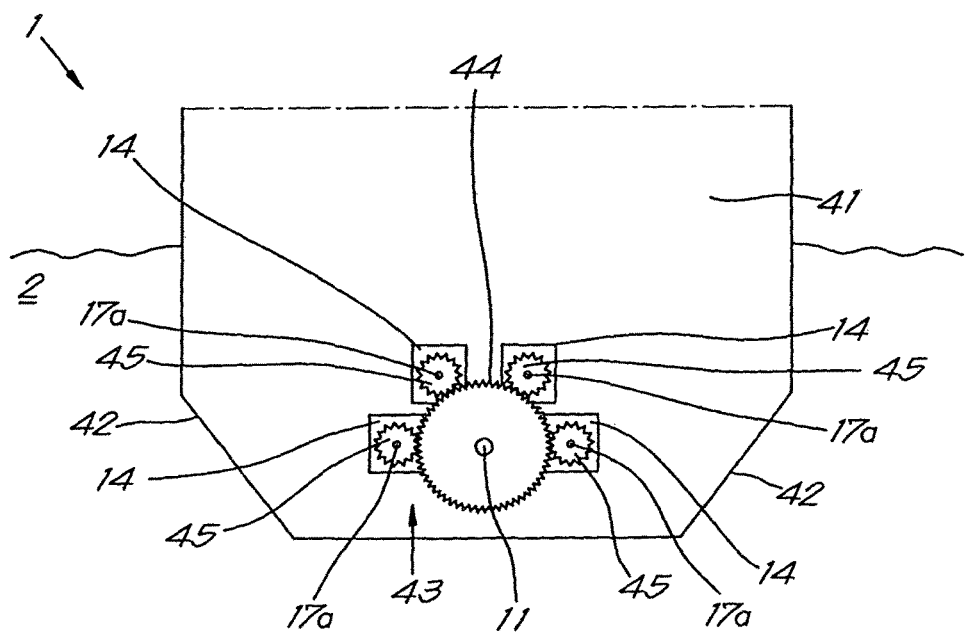
FIG. 16 schematically represents a cross section according to the line XVI-XVI in FIG. 15.

FIG. 16 schematically represents how several generator sets 14 are placed with respect to the gearwheel 44 in the floating structure 41.

In the example shown, there are four generator sets 14 placed on each side of the paddlewheel 10, which are in this case placed inside the floating structure.

In this case, the floating capacity of the paddlewheel 10 and the height of the water level 12 in the housing 3 are such that the height of the shaft 11 of the paddlewheel 10 corresponds to the bearing 46. This has the advantage that the weight of the paddlewheel 10 is completely cancelled by the floating capacity such that the bearing 46 and the coupling between the paddlewheel 10 and the drive shaft 17a of the generator sets 14 are completely or almost completely unloaded in the vertical direction. Due to this, there is less energy loss due to friction and a larger portion of electrical energy is available for conversion into electrical power.

The operation of the device 1 as represented in FIG. 15 is analogous to the operation of the device 1 as represented in FIG. 13.

It is clear that also in this embodiment the floating structure 41 can be in the form of a ship or similar.

It is clear that if desired, the gear transmission 43 and/or the generator sets 41 can be located in the internal space 8 of the housing 3.

Figure 17:
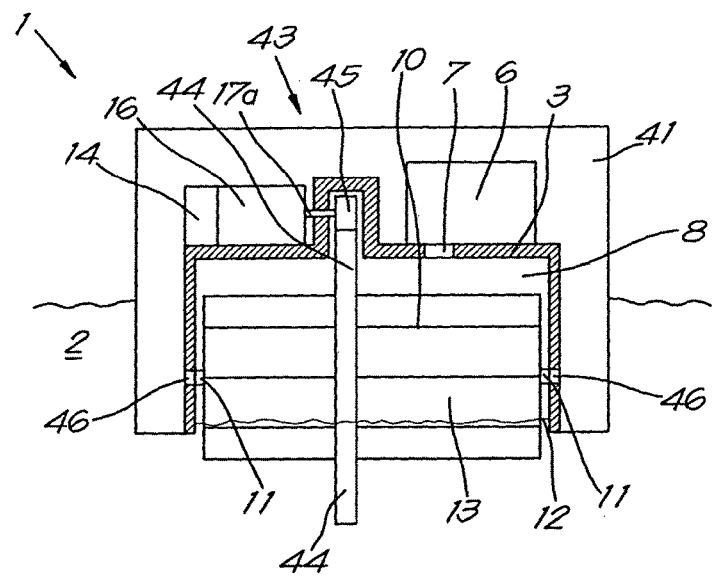
FIG. 17 represents a variant of the embodiment of FIG. 15.

A possible embodiment of this is shown in FIG. 17 which shows a variant of FIG. 15. The gearwheel 44 is placed in the middle or almost in the middle of the shaft 11 of the paddlewheel 10.

The gear transmission 43 is located in the internal space 8 of the housing 3, whereby the incoming driveshaft 17a of the generator set 14 extends through the housing 3.

As shown in FIGS. 15-16, the floating capacity of the paddlewheel 10 is such that, when the paddlewheel 10 floats freely on the water level 12 in the housing 2, the height of the shaft 11 of the paddlewheel 10 is such that the pitch circles of the gearwheels 45 of the generator set or sets 14 are tangent or nearly tangent to the pitch circle of the gearwheel 44 of the paddlewheel 10.

This has again the advantage that the weight of the paddlewheel 10 is neutralized completely by the floating capacity such that the coupling between the paddlewheel 10 and the drive shaft 17a of the generator sets 14 are completely or almost completely unloaded in the vertical direction.

An advantage of such an embodiment is that the gearwheel 44 can be made larger since the dimensions of the floating structure 41 wherein it is situated do not have to be taken into account. Moreover, the shaft 11 of the paddlewheel 10 does not extend through the housing 3, such that no special seals need to be provided on the shaft 11.

The operation is further similar to the embodiment of FIG. 15.

Figure 18:
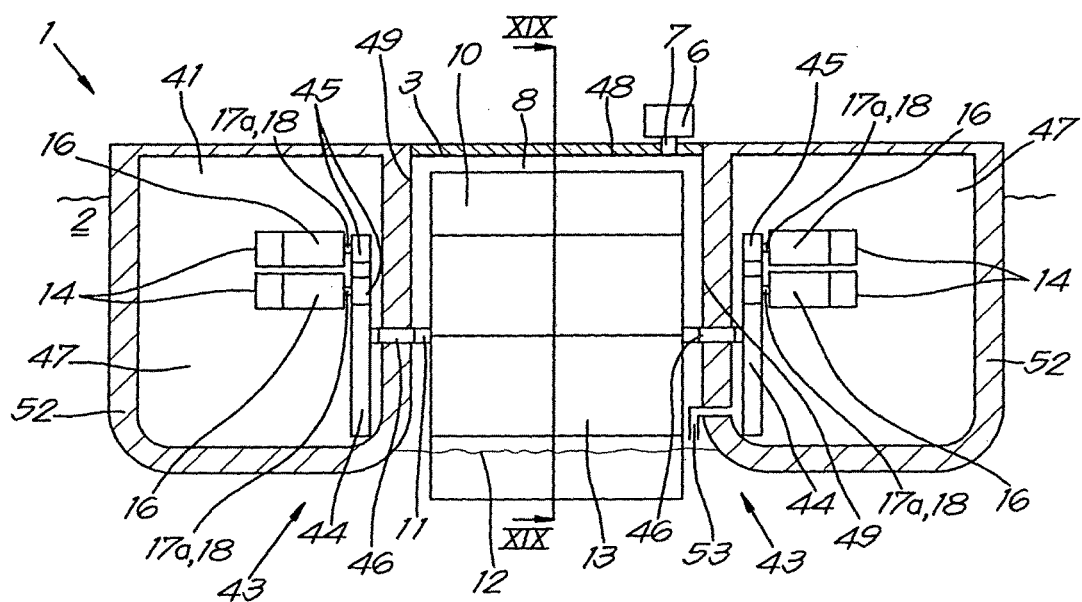
FIG. 18 schematically represents another alternative embodiment of the device according to the invention.
Figure 19:
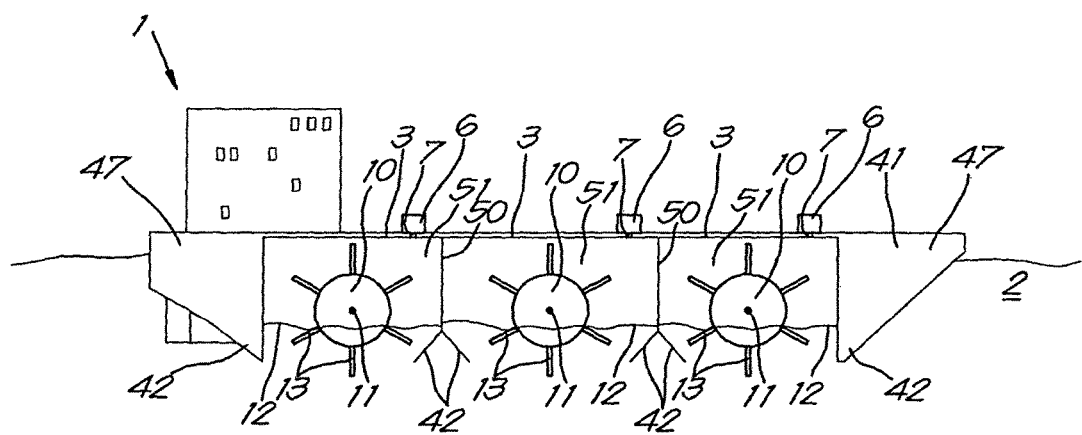
FIG. 19 schematically represents a cross section according to the line XIX-XIX in FIG. 18.

In FIGS. 18 and 19 yet another alternative embodiment is shown, that differs from the embodiment in FIG. 15 because the floating or buoyant structure 41 is formed by two hulls 47 in between which the housing 3 is placed.

In this case a connection 48 is placed between the hulls 47, similar to a catamaran, such that this connection 48 together with the sides 49 of the hulls 47 form a housing 3.

As can be seen in FIG. 19, a number of partitions 50 are placed between the two hulls 47, that extend perpendicular to the lengthwise direction of the hulls 47.

In this way several compartments are formed that serve as housings 3, whereby in each housing 3 a paddlewheel 10 is placed.

Each hull 47 is provided with one or more ballast tanks 52 that allow to adjust the floating capacity of the hull 47.

An air outlet 53 which is adjustable in height is provided in the housing 3. Via this air outlet 53 air, which was introduced into the housing 3 via the outlet 7 of the compressed air installation 6, can leave the housing 2 in a continuously variable manner.

This will allow to adjust the height of the water level 12 in the housing 3.

Adjusting the water level 12 has as an additional advantage being the fact that this can be used to control the speed of the paddlewheel 10. When the water level 12 in the housing 3 is adjusted, the paddles 13 will be more or less in the water, such that the forces that the paddles 13 will experience will change. This will make the paddlewheel 10 turn faster or slower, such that the speed of the generator sets 14 can be controlled.

By adjusting the water level 12, a part of the weight of the paddlewheel 10 will exert a force on the bearings 46. By making sure that the floating capacity of the paddlewheel 10 remains sufficiently large, these forces will be minimal, whereby at the same time a speed regulation is possible.

The speed of the paddlewheel 10 can also be adjusted by coupling more or fewer generator sets 14 with their gearwheel 45 to the gear transmission 43. By letting more gearwheels 45 act upon the gearwheel 44 of the shaft 11 of the paddlewheel 10, more friction will be generated so that the speed of the paddlewheel 10 will decrease.

By being able to regulate the speed of the paddlewheel and of the generator sets 14 coupled to it, it will be possible to omit the transmission 15 in the generator set 14. By means of regulating the water level 12 or by means of coupling generator sets 14 it can be ensured that the generator 16 is driven at an appropriate or optimal speed without the intervention of a transmission 15 in the generator set 14. This will reduce the price of the device 1.

By using hulls 47, the device 1 can be made large enough such that it is suitable for paddlewheels 10 with a length of about 40 to 50 meters and with a total diameter of 40 meter of which the paddles 13 are about 6 to 10 meter in height.

It is clear that the transmission of the movement of the shaft 11 of the paddlewheel 10 to the incoming drive shaft 17a via the gear transmission 43 can also be applied in all the above-mentioned embodiments.

Due to the floating capacity of the paddlewheel 10 and the floating capacity of the floating structure 41, it is also possible to omit the housing 3 and to let the paddlewheel 10 float freely on the surface of the water of the tidal river 2, estuary or similar whereby the paddlewheel 10 is suitably attached with its shaft 11 to the floating structure 41.

The generator sets 14 are suitably connected to the floating structure 41, such that when the floating structure 41 and the paddlewheel 10 float freely on the surface of the water of the tidal river 2, estuary or similar, the pitch circles of the gearwheels 45 of the generator set or sets 14 are tangent or nearly tangent to the pitch circle of the gearwheel 44 of the paddlewheel 10.

In all the above-mentioned embodiments it is possible that the housing 3 is made of a stiff material or from a flexible material, in which case the compressed air installation 6 will provide the necessary pressure to shape the housing 3.

The present invention is in no way limited to the form of embodiments described by way of an example and represented in the figures, however, such a device for generating hydroelectric power using the current of a river, estuary or similar according to the invention can be realized in various forms without leaving the scope of the invention.

The invention claimed is:

1. Device for generating hydroelectric energy using the current of a river (2), estuary or similar, which device (1) comprises a paddlewheel (10) including a shaft (11), which can turn freely around an axis X-X' and at least one electrical generator set (14) including a drive shaft (17a) for transmitting torque by being coupled to the shaft (11) of the paddlewheel (10), wherein the paddlewheel (10) is self-floating and in that the device (1) is provided with a complete or at least partially submerged housing (3) in the shape of a bell (3) with an open bottom (4) that is situated at a height (A) above a bed (5) of the river (2), estuary or similar in which the paddlewheel (10) is mounted with bearings on the housing (3) and has paddles (13) that extend at least partly below the open bottom (4) of the bell of which an internal space (8) is pressurized to adjust or preserve a water level (12) in the bell (3) such that the influence of the weight of the paddlewheel (10) on the bearings is neutralized for the major part.

2. Device according to claim 1, wherein a speed regulation is provided for regulating rotational speed of the paddlewheel (10) and the at least one generator set (14) coupled to the paddlewheel (10) by adjusting the water level (12) in the housing (3) to control a depth of the paddlewheel (10) in the water.

3. Device according to claim 1, wherein the device is provided with means for increasing a current of the river (2), the estuary or similar under the open bottom (4) of the bell (3) at the location of the paddlewheel (10).

4. Device according to claim 3, wherein these means are formed by a funnel (25).

5. Device according to claim 4, wherein when the device (1) is placed in a tidal river (2) or similar there are two funnels (25), one in each flow direction.

6. Device according to claim 1, wherein the shaft (11) of the paddlewheel (10) is situated above the water level (12) in the bell (3).

7. Device according to claim 1, wherein the paddles (13) are affixed to a cylindrical part of the shaft (11) that is of a floating material.

8. Device according to claim 1, wherein the paddles (13) are flat blades that are situated radially on the paddlewheel (10).

9. Device according to claim 1, wherein the generator set or sets (14) are affixed to the housing (3).

10. Device according to claim 9, wherein a floating capacity of the paddlewheel (10) and the location of the generator set or sets (14) in the housing (3) are such that, when the paddlewheel (10) floats freely on the water level (12) in the housing (3), the height of the shaft (11) of the paddlewheel (10) corresponds to the height of the drive shaft (17a) of the generator set or sets (14).

11. Device according to claim 1, wherein the drive shaft (17a) of the electrical generator set or sets (14) is coupled to the shaft (11) of the paddlewheel (10) by means of a gear transmission (43) with a gearwheel (44) on the shaft (11) of the paddlewheel (10) and a cooperating gearwheel (45) on the drive shaft (17a) of the generator set of sets (14).

12. Device according to claim 11, wherein the diameters of the gearwheels (44,45) are chosen such that the diameter of the gearwheel (44) of the paddlewheel (10) is at least 10 times larger than the diameter of the gearwheel (45) of the generator set or sets (14).

13. Device according to claim 11, wherein the floating capacity of the paddlewheel (10) and the location of the generator set or sets (14) are such that, when the paddlewheel (10) is floating freely on the water level (12) in the housing (3), the height of the shaft (11) of the paddlewheel (10) is such that the pitch circles of the gearwheels (45) of the generator set or sets (14) are tangent to or nearly tangent to the pitch circles of the gearwheel (44) of the paddlewheel (10).

14. Device according to claim 1, wherein the submerged housing (3) is kept at a height above the bed (5) of the river (2), estuary or similar by means of a floating or buoyant structure (41) in which the housing (3) is built-in.

15. Device according to claim 14, wherein several housings (3) are built-in in the afore-mentioned structure (41), whereby the paddlewheels (10) are placed parallel with their shafts (11) and placed one after the other with respect to the flow direction.

16. Device according to claim 14, wherein the floating capacity of the floating or buoyant structure (41) can be adjusted.

17. Device according to claim 14, wherein the floating or buoyant structure (41) is a ship.

18. Device according to claim 1, wherein the device is provided with two hulls (47) in between which the housing (3) is placed.

19. Device according to claim 18, wherein partitions (50) are placed between the hulls (47) to form compartments (51) between the hulls (47), which compartments (51) serve as said housing (3), whereby said paddlewheel (10) is placed in each compartment (51).

20. Device according to claim 1, wherein several paddlewheels (10) are placed in the housing (3).

21. Device according to claim 1, wherein the device (1) comprises several paddlewheels (10), whereby at least on paddlewheel (10) is only driven by the current of the river (2), estuary or similar in a first flow direction and whereby at least one other paddlewheel (10) is only driven by the current of the river (2), estuary or similar in the second, opposite flow direction.

22. Device according to claim 1, wherein the paddlewheel (10) turns freely in two direction around the axis X-X'.

23. Device according to claim 1, wherein at least two generator sets (14) are provided and that at least one generator set (14) turns in a first direction of rotation with the shaft (11) of the paddlewheel (10) and turns freely in the second direction of rotation, while the other generator set (14) turns freely in the first direction of rotation and turns in the second direction of rotation with the shaft (11) of the paddlewheel (10), for example by means of a freewheel (19) that enables a free rotation in one direction and forms a fixed turning coupling in the other direction of rotation.

24. Device according to claim 1, wherein the generator set (14) comprises a transmission (15) between the generator (16) and the shaft (11) of the paddlewheel (10) and that the transmission (15) comprises a mechanism to reverse the direction of rotation of the shaft (18) of the generator (16) with respect to the paddlewheel (10) to ensure that the generator (16) is always driven in the same direction of rotation irrespective of the direction of rotation of the paddlewheel (10).

25. A series of devices (1) according to claim 1, wherein they are placed in a tidal river (2) or estuary at a distance of one another viewed in the direction of flow of the tidal river (2) or estuary and are spread over a distance of the tidal river (2) or the estuary such that at least one device (1) is always in a zone with flow.

26. A series of devices (1) according to claim 1, wherein they are placed in a tidal river (2) or estuary, whereby the devices (1) are placed next to and on top of each other to form a wall (36) of devices (1) which extends perpendicular to the flow direction of the tidal river (2) or estuary and with fee spaces (37) under the devices (1) to allow the current to pass through.

* * * * *